Sept. 10, 1940.  M. S. WILLING ET AL  2,214,569
PARACHUTE
Filed Feb. 21, 1938
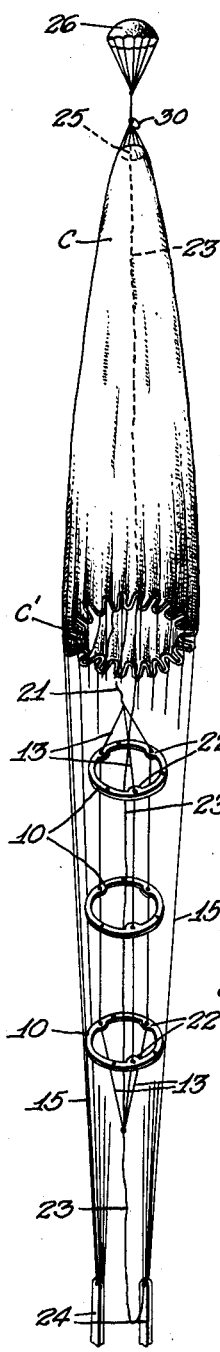
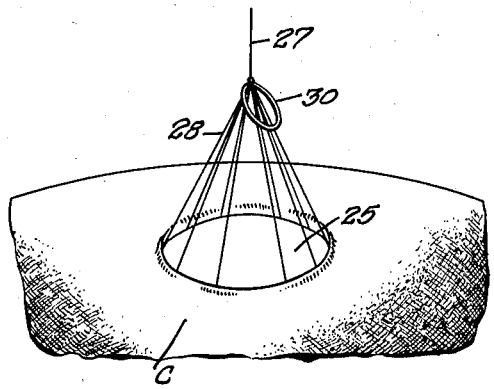
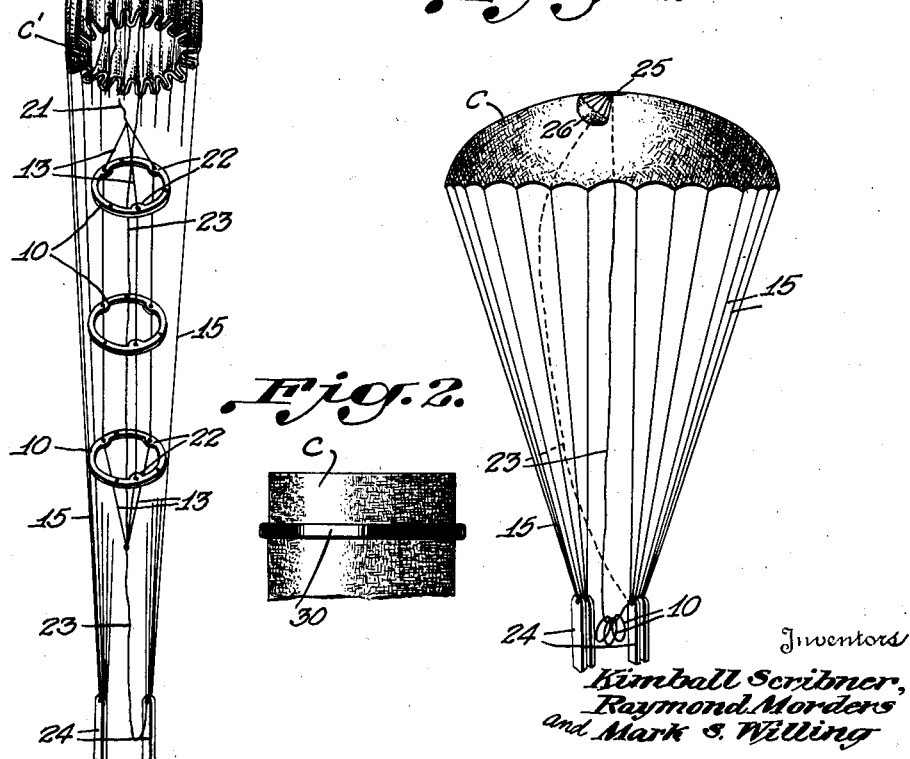
Inventors
Kimball Scribner,
Raymond Morders
and Mark S. Willing
By Chester L. Davis
Attorney Patented Sept. 10, 1940

2,214,569

UNITED STATES PATENT OFFICE 2,214,569

PARACHUTE

Mark S. Willing, Mount Holly, Va., and Kimball Scribner and Raymond Morders, Washington, D. C., assignors of two and one-half per cent to Marshall L. Faber and two and one-half per cent to Chester L. Davis, both of Washington, D. C.

Application February 21, 1938, Serial No. 191,798

2 Claims. (Cl. 244—142)

This invention relates to improvements in parachutes and has for its primary object the provision of means whereby the parachute will open more rapidly than those heretofore employed.

A further object of our invention is to provide a parachute canopy so constructed that there will not be an opposing body of air contained therein during the initial stages of opening.

A still further object of the present invention is to make an improvement on the vent portion of the canopy of a parachute.

A better understanding of our invention will be had from the specification to follow and from the following drawing, wherein:

Fig. 1 shows an elevational side view of the parachute in an early stage of opening.

Fig. 2 shows the sectional view of the uppermost portion or vent section of the parachute.

Fig. 3 shows the vent portion expanded after the parachute has opened, and

Fig. 4 shows the parachute after it has completely opened.

A more complete understanding of our invention will be had from examining Fig. 1 in detail and by the following specification. It has been determined that when the pilot chute 26 draws the top of the canopy C out of the covering in which it is normally packed, this uppermost section constitutes what might be considered an inverted parachute, that is, the top section of the canopy initially accumulates a chamber of air, the vent 25 acting as the skirt of this so-called inverted parachute.

When the pilot chute 26 pulls on the connecting line 27 it acts in the same manner as an inverted load on the uppermost portion of the canopy. It is true that as the load 24 tightens the shroud lines 15 and the skirt portion C' of the canopy C opens, it is necessary for the main column of air now being established to overcome the opposing force of that column of air already established in the uppermost portion of the canopy C. Experimental tests indicate that this causes an appreciable delay in the complete opening time.

Although the present application illustrates the use of a parachute constructed in accordance with the description set forth in the earlier patent to Mark S. Willing, No. 2,103,806, of December 28, 1937, it will be realized that it is applicable to any type of parachute.

As described in the above-mentioned patent rings 10 are connected together by lines 23 which pass through eyelets 22 on the rings 10 and the entire ring assembly is supported by cords 13, 21 and 23 the length of the entire parachute. As the load 24 becomes effective, rings 10 successively emerge from the lowermost portion of the canopy C until the cord 21, which is normally fastened to the vent 25, becomes severed therefrom.

It has been found that it is desirable to close off the vent portion 25 of the canopy C during the initial stage of opening and in Fig. 3 is shown one method for doing this. Fig. 2 shows the canopy C folded up as it will appear in the initial stages of opening, the part of the canopy which normally forms the vent being closed by means of the elastic band 30. Fig. 3 shows the vent portion of the canopy after the canopy has expanded, and it will be noticed that the elastic band 30 has been forced off of the canopy proper and is on the connecting line 27 which normally leads to the pilot chute. Although Fig. 3 shows the vent opened it will be understood that before the canopy C enlarges there is not sufficient force within the canopy C to keep it open, and it would accordingly be closed and prevent air from passing therethrough.

Fig. 4 shows in addition to what is shown in Fig. 1 the provision of a central shroud line 23 for use in maneuvering the parachute. The rings 10 are also shown collected near the load 24.

We realize that many modifications of our invention other than those described could be made use of without departing from the spirit of our invention. Accordingly, it is understood that our invention shall not be limited except by the scope of the following claims.

What we claim is:

1. In a parachute, a canopy having a vent portion, means for keeping said vent portion closed until said canopy becomes substantially filled with air, said means comprising an elastic band surrounding the folded vent portion and adapted to be released therefrom when force is applied thereto by the canopy expanding.

2. A parachute including a canopy and shroud lines connected to the canopy for suspending a load, said canopy having a vent adjacent the apex thereof and an elastic band encircling the material of the canopy closely adjacent the vent and closing the same and adapted to spring free from said canopy when the canopy expands.

MARK S. WILLING.
KIMBALL SCRIBNER.
RAYMOND MORDERS.